(Model.)
W. H. DICKE.
CASTER FOR FURNITURE.
No. 408,656. Patented Aug. 6, 1889.
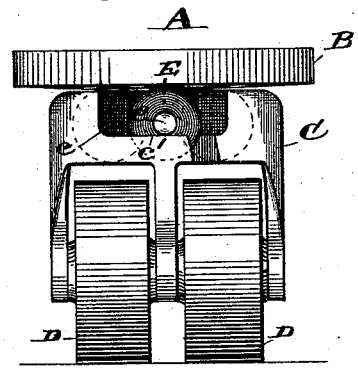
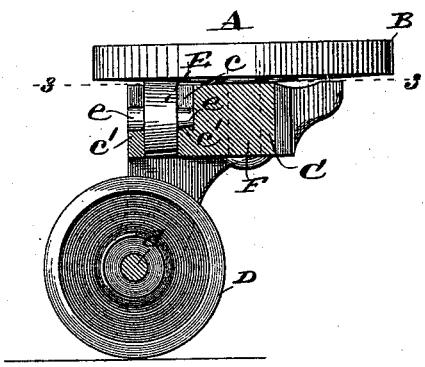
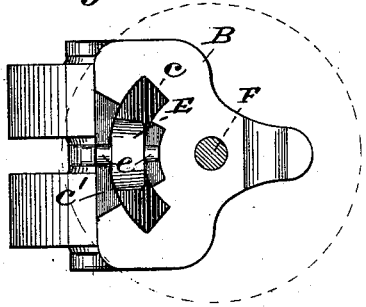
Attest:
S. W. C. Sanford
G. M. Hinchman Jr.
Inventor:
Wilhelm H. Dicke.
by C. D. Moody
atty

UNITED STATES PATENT OFFICE.

WILHELM H. DICKE, OF ST. LOUIS, MISSOURI, ASSIGNOR OF ONE-HALF TO AUGUST H. GAERTNER, OF SAME PLACE.

CASTER FOR FURNITURE.

SPECIFICATION forming part of Letters Patent No. 408,656, dated August 6, 1889.

Application filed March 12, 1889. Serial No. 303,038. (Model.)

*To all whom it may concern:*

Be it known that I, WILHELM H. DICKE, of St. Louis, Missouri, have made a new and useful Improvement in Casters for Furniture, Trunks, and other Movable Articles, of which the following is a full, clear, and exact description.

The improvement relates to that class of casters which are termed "anti-friction casters," and more particularly to those casters having an anti-friction wheel in the body of the caster for the top plate of the caster to roll upon; and it consists in the special arrangement of the anti-friction wheel, substantially as hereinafter described and claimed, aided by the annexed drawings, forming part of this specification, of which—

Figure 1 is a front elevation of the improved caster, part of the front being shown as broken away to expose to view the friction-wheel groove; Fig. 2, a view of the improved caster, part being in section and part in elevation; and Fig. 3, a horizontal section on the line 3 3 of Fig. 2.

The improved caster is of the usual form, saving as it is modified or supplemented by the peculiar features constituting the improvement.

The same letters of reference denote the same parts.

A represents the improved caster; B, the top plate of the caster, by which the caster is attached to the article it is to support; C, the body; D D, the main wheels revolving on their axle $d$; E, the friction-wheel; F, the main pivot connecting the plate B to the body C; $c$, groove in the top of body C, to receive the friction-wheel E and allow sufficient space for it to roll back and forth therein; $c'$, tracks or bearings provided on the sides of groove $c$, for axle $e$ of friction-wheel E to rest and roll on.

In the usual construction of this class of casters the anti-friction wheel is journaled in a fixed bearing provided therefor, whereby more or less friction is produced. To obviate this defect is the object of the improvement under consideration, which consists in the peculiar arrangement herein described, whereby the friction-wheel of the caster as it revolves is caused to roll on its axle, which is fast in the wheel and projects from the sides thereof, forming gudgeons, and which thereby travels back and forth on tracks provided therefor instead of being confined in the usual fixed bearings.

The application and operation of the improved caster are as follows: The caster being attached in the usual manner to any article of furniture desired, the top plate B bears on the friction-wheel E, and consequently when the article of furniture is turned to the right or left the anti-friction wheel revolves and the axle thereof rolls and travels on the tracks provided for it in the same direction, respectively, and as indicated by the broken lines Fig. 1. The axle or gudgeons of the friction-wheel are tapering, the inner end of the axle, or the inner "gudgeon," as it may indifferently be termed, diminishing from the wheel and the outer one enlarging. The anti-friction wheel travels in a curve the center of which is the main pivot of the caster, and the groove $c$ conforms thereto, and the groove is open at the bottom to prevent dust and dirt from collecting therein.

The friction-wheel is located almost directly over the axles of the main wheels.

I claim—

1. The combination of the main wheel, the grooved body, the top plate, and the anti-friction wheel, said anti-friction wheel having journals rollable upon bearings in or upon said body, and said top plate turning upon said body and bearing upon said anti-friction wheel, substantially as described.

2. The combination, in a caster, of the caster-body, the top plate, and the anti-friction wheel, said body having a curved groove and bearings at the sides, respectively, thereof, said anti-friction wheel having tapering journals rollable upon said bearings, and said top plate being pivoted to said body and bearing upon said anti-friction wheel, substantially as described.

Witness my hand this 1st day of March, 1889.

WILHELM H. DICKE.

Witnesses:
 C. D. MOODY,
 AUG. H. GAERTNER.